(12) United States Patent
Shimizu et al.

(10) Patent No.: US 6,740,986 B2
(45) Date of Patent: May 25, 2004

(54) ENGINE GENERATOR

(75) Inventors: Motohiro Shimizu, Saitama (JP); Masashi Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 72 days.

(21) Appl. No.: 10/214,305

(22) Filed: Aug. 8, 2002

(65) Prior Publication Data

US 2003/0042742 A1 Mar. 6, 2003

(30) Foreign Application Priority Data

Sep. 4, 2001 (JP) .................................. P2001-267628

(51) Int. Cl.[7] .............................. H02P 9/04; F02D 41/00
(52) U.S. Cl. ................. 290/40 C; 290/40 A; 290/40 B; 322/38; 123/339.1
(58) Field of Search ............................. 290/1 A, 40 A, 290/40 B, 40 C; 322/37, 38; 123/339.1, 352

(56) References Cited

U.S. PATENT DOCUMENTS

| 4,834,045 | A | * | 5/1989 | Imai et al. .................. 123/352 |
| 5,621,304 | A | * | 4/1997 | Kiuchi et al. .................. 322/18 |
| 6,118,186 | A | * | 9/2000 | Scott et al. ................ 290/40 B |
| 6,127,813 | A | * | 10/2000 | Tamagawa .................... 322/16 |
| 6,130,486 | A | * | 10/2000 | Shimizu et al. ........... 240/40 C |
| 6,520,142 | B2 | * | 2/2003 | Nogi et al. .................. 123/299 |
| 6,522,024 | B1 | * | 2/2003 | Takaoka et al. .......... 290/40 C |
| 6,541,876 | B2 | * | 4/2003 | Shimizu et al. ........... 290/40 A |
| 6,624,528 | B2 | * | 9/2003 | Shimizu et al. ........... 290/40 C |
| 2001/0029424 | A1 | * | 10/2001 | Iwamoto et al. ............. 701/114 |
| 2002/0047271 | A1 | * | 4/2002 | Shimizu et al. ........... 290/40 C |

FOREIGN PATENT DOCUMENTS

| JP | 2740567 | 1/1998 |
| JP | 11-308896 | 11/1999 |

* cited by examiner

*Primary Examiner*—Nicholas Ponomarenko
(74) *Attorney, Agent, or Firm*—Westerman, Hattori, Daniels & Adrian, LLP

(57) ABSTRACT

The throttle opening setting value provided from a throttle controller 108 may exceed the actual controllable range of the throttle opening. The value stored in an output voltage setter 20 is read out in response to its throttle opening setting value and transferred to a correction signal generator 21. The generator 21 supplies a correction signal determined by the output voltage setting to a modulator 23. PWM signal is transferred to an inverter 3 for determining the output voltage. When receiving the opening setting value indicative of overloading, the output voltage setter 20 releases a smaller value to decrease the output of the generator.

9 Claims, 5 Drawing Sheets

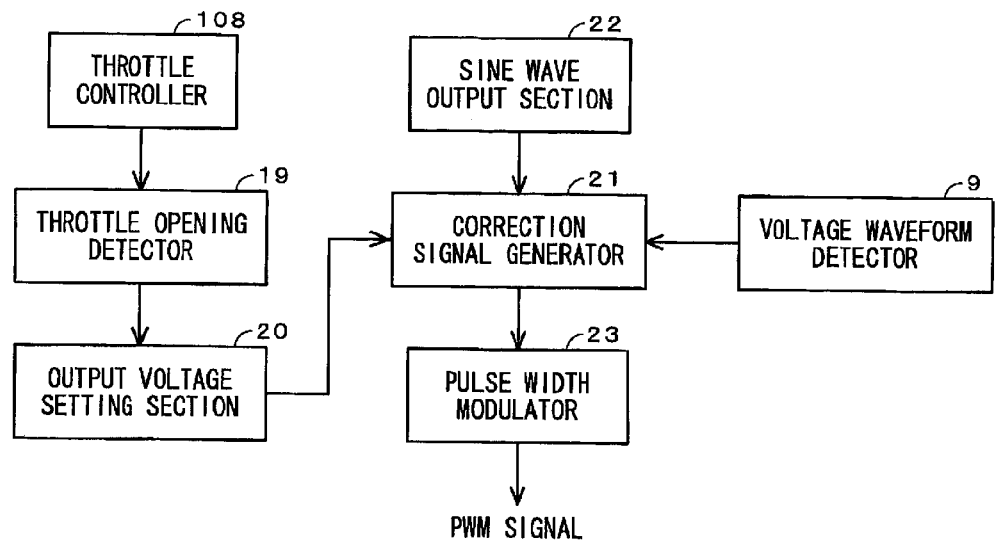
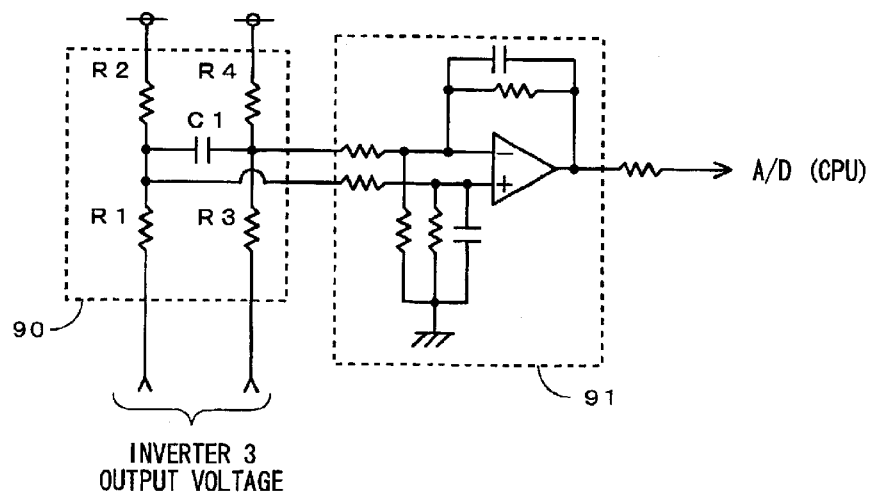

CONTROLLED LEVEL OF THROTTLE OPENING (%)

ENGINE GENERATOR

BACKGROUND OF THE INVENTION

1. Field of the Invention

The present invention relates to an engine generator and particularly to an engine generator capable of making efficient use of the engine power to produce a surplus of output with relation to greater load.

2. Description of the Related Art

It has widely been known to have a portable or mobile electric power source, such as an alternating current generator driven by an engine, equipped with an inverter apparatus for stabilizing its output voltage. A common engine generator includes a governor for controlling the number of revolutions of the engine by carrying out proportional, integral, and differential (PID) operations of a voltage corresponding to a deviation in the actual number of engine revolutions from the target value and determining the supply of fuel from the result of the operations. For example, the applicants of this invention, have developed and proposed a technique for monitoring a surplus of the electricity output of an engine generator equipped with a governor and determining the throttle opening for controlling the revolutions of engine to maintain a proper rate of the surplus of the electricity output (Japanese Patent Laid-open Heisei 11-308896).

When its maximum output is desired, the engine generator may operate with its throttle fully opened. If the load is increased during the full power operation, it will be an overload to the engine which is thus declined in the number of revolutions while running with the throttle fully opened. As the engine is declined in the power output, its driving force against the load will drop down. The drop down of the driving force may result in stalling of the engine.

For avoiding such an adverse effect, it is desired to open the throttle not fully for operation but with some redundancy. Without full throttle opening, the engine can hardly be operated at substantially its maximum power. Also, the engines tend to be overloaded at a specific range of revolutions depending on their types or may have biased characteristics for being overloaded at high temperatures.

SUMMARY OF THE INVENTION

It is an object of the present invention to provide an engine generator which can operate at substantially its maximum power even when the load is relatively great.

The first feature of this invention is in an engine generator which has an engine, a generator driven by the engine, and a throttle controlling means for controlling the throttle opening in the engine so that the output voltage of the generator converged to a predetermined target value, wherein an output voltage decreasing range which corresponds to a predetermined scale of the opening is assigned within a controllable range of the throttle opening, and when the throttle opening control comes into the output voltage decreasing range, the output voltage of the generator is made to decreased.

The second feature of this invention is in the engine generator in which an opening setting value provided from the throttle controlling means for controlling the throttle opening is arranged indicative of a load in the throttle opening controllable range, and when the throttle opening control comes into the output voltage decreasing range, the output voltage is made to decreased to a level determined by the opening setting value.

The third feature of this invention is in an engine generator which has a throttle controlling means for controlling the throttle opening in the engine according to a control data which is determined that the output voltage of the generator converged to a predetermined target value, wherein an output voltage decreasing range is assigned to exceed a controllable range of the throttle opening, and when the throttle opening control comes into the output voltage decreasing range, the output voltage of the generator is made to decreased in response to the control data which is arranged indicative of the output voltage decreasing range.

The forth feature of this invention is the engine generator in which the output voltage decreasing range is assigned extending to the controllable range of the throttle opening.

The fifth feature of this invention is in the engine generator in which the control data provided from the throttle controlling means for controlling the throttle opening is an opening setting value which is arranged indicative of a load in both the throttle opening controllable range and the range exceeding the throttle opening controllable range, and when the throttle opening control comes into the output voltage decreasing range, the output voltage is made to decreased in response to the opening setting value.

According to the first to fifth features, as the output voltage of the generator is made to decreased at the predetermined output voltage decreasing range, the load to the engine can be lowered. Particularly according to the first feature, the output voltage decreasing range is assigned within the controllable range of the throttle opening. According to the third feature, the output voltage decreasing range is assigned to exceed the controllable range of the throttle opening. According to the second or fifth feature, the output voltage decreasing range allows the output voltage to be controlled in response to the throttle opening setting which is indicative of the load; the greater the throttle opening, the lower the output voltage is made to decreased. According to the fourth feature, the output voltage decreasing range is extended from the throttle opening controllable range to the extra range exceeding the throttle opening controllable range, thus allowing the throttle opening control to be smoothly carried out between the two ranges.

The sixth feature of the present invention is that the output voltage decreasing range is sifted to its less loaded side determined by the throttle opening setting when the engine runs at a predetermined lower number of revolutions. The sixth feature allows the load to be lowered at the range where the number of engine revolutions is small.

The seventh feature of the present invention is that the output voltage decreasing range is sifted to its less loaded side determined by the throttle opening setting when the engine is overheated. The seventh feature allows the load to be lowered before the overheating results in overloading.

BRIEF DESCRIPTION OF THE DRAWINGS

FIG. 1 is a functional block diagram of a primary part of an engine revolution controller according to one embodiment of the present invention;

FIG. 3 is a circuitry diagram showing a voltage waveform detector;

DETAILED DESCRIPTION OF THE PREFERRED EMBODIMENTS

Figure 2:
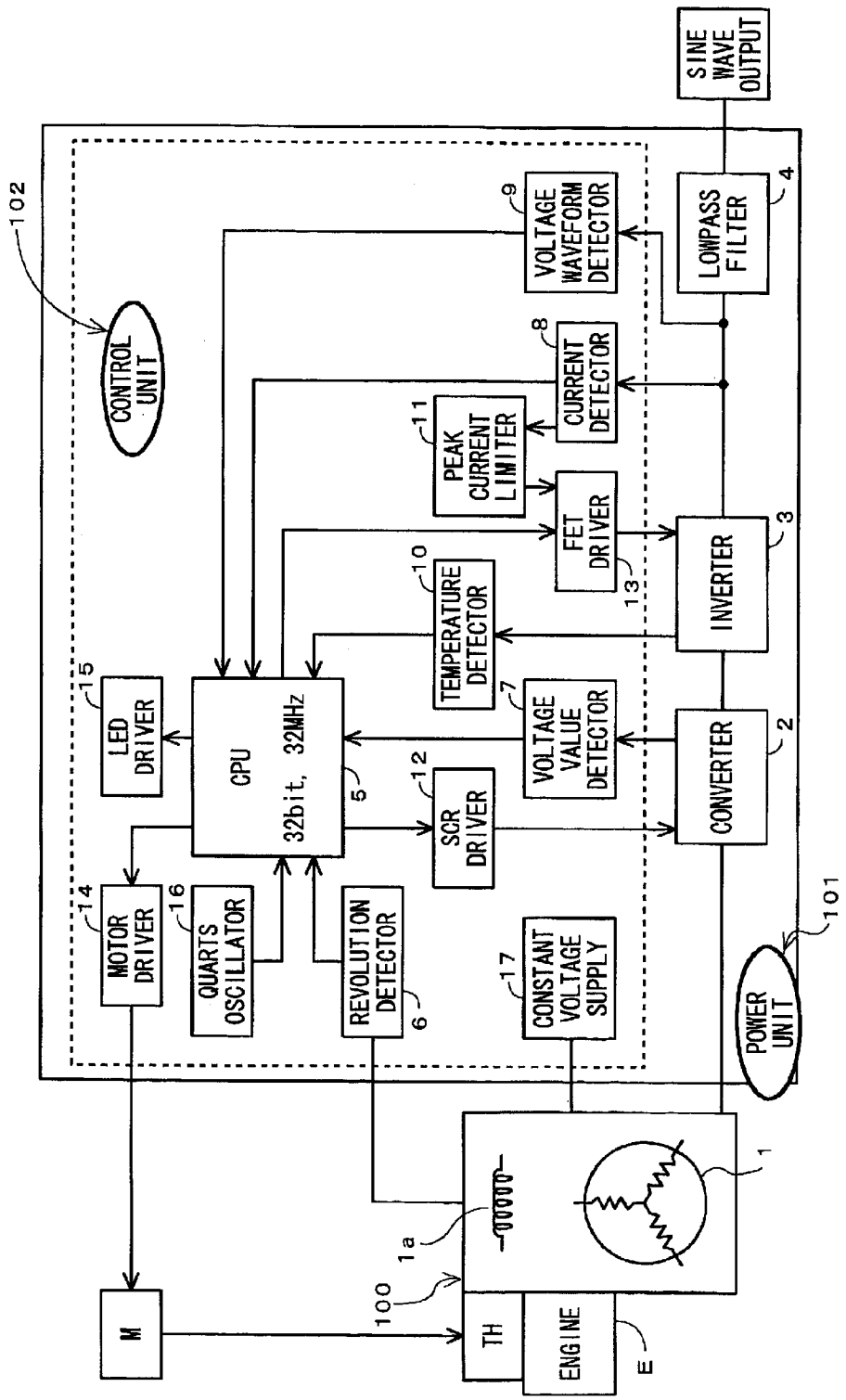
FIG. 2 is a functional block diagram showing an engine generator of the embodiment of the present invention.

One embodiment of the present invention will be described in more detail referring to the relevant drawings. FIG. 2 is a block diagram showing an arrangement of an inverter apparatus of the embodiment of the present invention. A generator 100 includes a rotor driven by an engine E and a stator (rotor and stator are not shown). The stator has a three-phase output winding 1 and a single-phase auxiliary winding 1a wound thereon. The engine E is equipped with a throttle valve TH and a stepping motor M for driving the throttle valve TH.

The rotor in the generator 100 has multi-pole permanent magnets and when driven by the engine E, causes the three-phase output winding 1 to generate an alternating current at a frequency determined by the number of revolutions of the engine E. The alternating current output of the three-phase output winding 1 is then transferred to a direct current source circuit or converter 2 where it is converted into a direct current form. The direct current output of the converter 2 is transferred to a switching device or inverter 3 where it is converted into an alternating current at a predetermined frequency by the action of an FET bridge circuit. The alternating current from the inverter 3 is received by a lowpass filter 4 (L-C lowpass) where its low frequency component (a commercial frequency range in this embodiment) is filtered out for providing an alternating current output with a commercial frequency.

The engine E, the converter 2, the inverter 3, and the lowpass filter 4 constitute a power unit 101 which is controlled by a control unit 102. The control unit 102 includes a 32-bit central processing unit (CPU) 5 which carries out overall processing actions at 32 MHz. The CPU 5 is timed with a reference clock signal of output pulses from a quarts oscillator 16. A constant voltage supply 17 serves as a power source of the control unit 102 for converting the output of the auxiliary winding 1a into a constant voltage.

Data required for operations in the CPU 5 are supplied from the following detectors. A revolution detector 6 is provided for measuring the number of revolutions of the engine E from the alternating current output of the auxiliary winding 1a. Provided as means for detecting the state of the power unit 101 are a voltage detector 7 for measuring the direct current output of the converter 2, a current detector 8 for measuring the output current of the inverter 3, a voltage waveform detector 9 for measuring the waveform of the voltage output of the inverter 3, and a temperature detector 10 for measuring the temperature of the inverter 3. In addition, a peak current limiter 11 for protecting the inverter 3 from over-current.

The converter 2 incorporates a rectifier circuit which has thyristors (SCR) connected in a bridge pattern. Accordingly, the control unit 102 includes an SCR driver 12 for controlling gate signals of the thyristors, an FET driver 13 acting as a switching circuit for controlling the FET of each arm of the bridge circuit in the inverter 3, a motor driver 14 for controlling the stepping motor M to determine the opening of the throttle TH, and an LED driver 15 for driving LEDs for data display. In response to the detected data supplied with the detectors 6, 7, 8, 9, and 10, the CPU 5 generates command signals to the drivers 12, 13, 14, and 15.

The SCR driver 12 is supplied with a command for controlling the conduction angle on the thyristors to maintain the direct current voltage output of the voltage detector 7 at a predetermined level. In response to the command, the SCR driver 12 determines the conduction angle on the thyristors in the converter 2. As the load increases, the direct current output of the converter 2 is declined. Even when the load increases, the direct current voltage can be maintained at the predetermined level by increasing the conduction angle on the thyristors. The conduction angle on the thyristors relates to a surplus of the output of the generator 100 against the load. When the conduction angle is controlled to a desired degree by the number of engine revolutions, the generator 100 can produce an output with generous surplus. In other words, the number of revolutions of the engine E is determined so as to maintain the conduction angle at a desired degree.

The CPU 5 provides the motor driver 14 with a command for adjusting the number of revolutions detected by the revolution detector 6 to a desired level. In response to the command from the CPU 5, the motor driver 14 drives the stepping motor M to determine the throttle opening. This action increases the number of revolutions of the engine E when the load increases so that the conduction angle on the thyristors in the converter 2 remains at a desired degree.

The CPU 5 includes a sine wave generating means for generating a reference sine wave signal at a given frequency (e.g. a commercial frequency) and a pulse width modulating means for pulse width modulating the reference sine wave signal to produce a PWM signal. Also, the CPU 5 has a correction signal calculating means arranged responsive to the wave signal received from the voltage waveform detector 9 for calculating a corrected form of the reference sine wave signal whereby the output of the lowpass filter 4 can exhibit a desired sine waveform containing neither distortion nor offset component.

The FET driver 13 includes a switching control circuit arranged responsive to the PWM signal for switching the FEATS in the inverter 3. In response to the PWM signal received from the CPU 5, the FET driver 13 switches the FEATS.

The CPU 5 also has a breaker function for stopping the output when the current measurement detected by the current detector 8 exceeds a predetermined level for a predetermined period of time. When the temperature measured by the temperature detector 10 is higher than a reference level determined for protection of the FEATS in the inverter 3, the CPU 5 stops generator 100 to provide the power output.

FIG. 3 is a circuitry diagram showing an arrangement of the voltage waveform detector 9. The voltage waveform detector 9 comprises a detector circuit 90 including two pairs of voltage-divider resistors R1, R2 and R3, R4 and a capacitor C1 and a differential amplifier 91. The output voltage from the inverter 3 is received by the detector circuit 90 where its carrier frequency component is removed and its resultant waveform of alternating current becomes similar to the output waveform of the lowpass filter 4. The alternating current output is amplified by the differential amplifier 91 and then transferred to the CPU 5 where it is compared with the reference sine wave signal to detect the presence of distortion or offset component.

Figure 4:
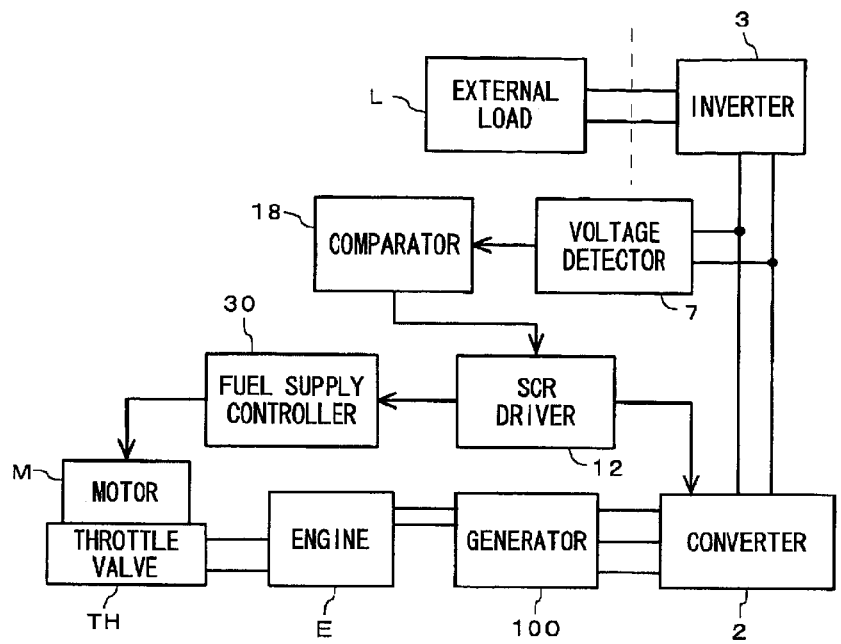
FIG. 4 is a block diagram schematically showing an arrangement of the engine revolution controller.

FIG. 4 is a block diagram showing an arrangement of the engine revolution controller. Components which are either identical or similar to those of FIG. 2 are denoted by the same numerals as those of FIG. 2. The output side of the inverter 3 is connected to an external electrical load L. The number of revolutions of the engine E is controlled so that the conduction angle of thyristors in the converter 2 is kept at a predetermined degree. A measurement of the output voltage of the converter 2 detected by the voltage detector 7 is transferred to a comparator 18. The comparator 18 compares between the output voltage (a real measurement) and the target voltage (e.g. 170 V) to determine and release a difference of the output voltage. A thyristor driver circuit or SCR driver 12 controls the conduction angle of the thyristors in the converter 2 by a known appropriate manner. A fuel supply controller 30 examines the conduction angle of the thyristors from a driving signal which has been dispatched from the SCR driver 12 to the converter 2 and determines a number of pulses which is then fed to the stepping motor M for correcting the conduction angle to a predetermined degree.

Figure 5:
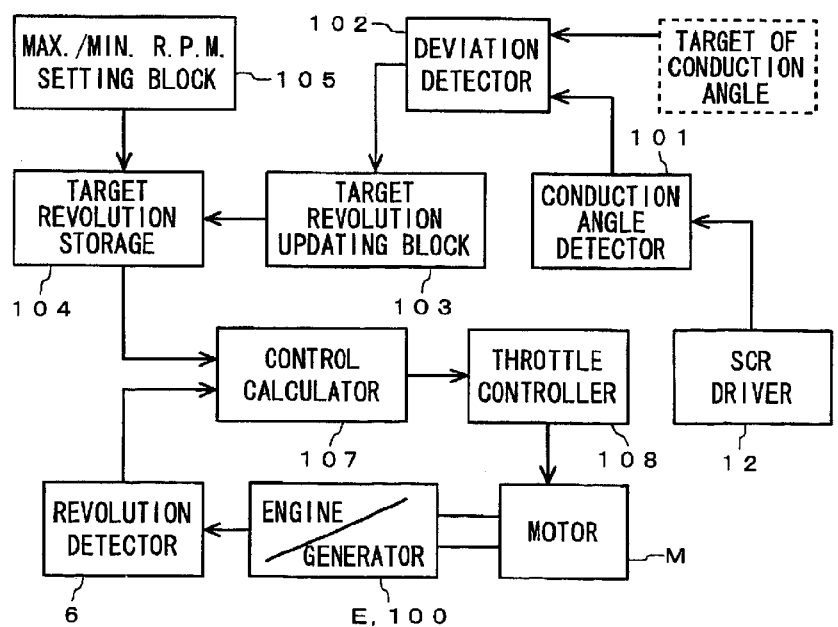
FIG. 5 is a block diagram showing a fuel supply controller.

FIG. 5 is a block diagram showing a function of the fuel flow controller 10. A thyristor conduction angle detector 101 detects the conduction angle on the basis of a control signal supplied from the thyristor (SCR) driver circuit 12 to the converter 2. The conduction angle is continuously measured at predetermined periods to have an average. The average conduction angle may preferably be determined from a moving average of consecutive data (e.g. of 10 times).

The average conduction angle determined by the thyristor conduction angle detector 101 is then supplied to a deviation detector 102 for detecting a deviation from the target conduction angle. The deviation is used to judge whether or not the generator 100 runs with ample margins or surplus of its output. For that purpose, the target conduction angle may be set to 80 percent. It is preferred that the target conduction angle is hysteretic as in a common control parameter. The target conduction angle may be a fixed value or may be varied depending on the temperature of the engine 2. For example, when the temperature of the engine 2 is low, the target conduction angle is set at a small degree. In this manner, the engine E is favorably controlled in the revolution so that the deviation detected by the deviation detector 102 is zero and can thus be maintained in its generous state.

A target revolution updating block 103 is responsive to the deviation received from the deviation detector 102 to generate and deliver an engine revolution adjustment.

A target revolution storage 104 adds the engine revolution adjustment received from the target revolution updating block 103 to the target revolution, which has been saved therein, in order to have a new target revolution. The target revolution is updated while not departing from the range of engine revolution between maximum and minimum which has been determined by a maximum/minimum revolution setting block 105. More particularly, in case that the target revolution calculated by adding the engine revolution adjustment departs from the range, the maximum or minimum of the range is assigned as a new target revolution. The minimum range is used because the conduction angle of the thyristors particularly at a lower rate of the revolution may be susceptible to every small change in the revolution. As such drawback is avoided, the stable revolution of the engine can be ensured without or with a small load.

A revolution detector 6 detects the revolution of the generator 100. A control calculator 107 calculates a control, which suppresses the deviation of the real revolution from the target revolution to zero, from the real revolution received from the revolution detector 106 and the target revolution read out from the target revolution storage 104, using a known appropriate method (for example, proportion, integral, and differential calculation). A throttle controller 108 includes a stepping motor M and generates a train of pulses for driving the stepping motor M corresponding to the control received from the control calculator 107. The stepping motor M rotates in response to the pulses to change the throttle opening.

When the throttle valve TH is opened at almost its full scale during the operation, its opening hardly responds to any greater load and may fail to maintain the number of engine revolutions. Hence, the number of revolutions of the engine can be determined by controlling the opening of the throttle valve TH while the throttle action is within its controllable range. On the other hand, once the engine control through the throttle opening control is out of the controllable range, the output voltage of the inverter 3 can be controlled or suppressed to maintain the number of engine revolutions thus increasing the apparent output.

FIG. 1 is a functional block diagram showing a primary part of the controller for maintaining the number of engine revolutions. A throttle opening detector 19 is provided for detecting the throttle opening θTH from the number of pulses which has been dispatched as an opening setting value from the throttle controller 108 to the motor M. More particularly, the throttle opening detector 19 sets the controllable range of the throttle opening θTH to a level greater than the actual full opening scale for detecting any opening setting for greater than the full opening scale. In practice, the maximum number of revolutions to be saved in the target revolution number storage 104 (FIG. 5) is increased and in case of overloading, an opening setting for opening the throttle to a level (e.g. 115%) greater than the full opening scale can be released by the throttle controller 108.

An output voltage setting section 20 contains a table (described later in more detail) where output voltage settings corresponding to the throttle opening θTH are stored and can release one of the output voltage settings depending on the level of the throttle opening θTH received. The output voltage setting is then received by a correction signal generator 21 for generating a correction signal of PWM format which is inputted to the inverter 3.

Meanwhile, the voltage waveform signal detected by the voltage waveform detector 9 is A/D converted and inputted to the correction signal generator 21. The correction signal generator 21 compares the voltage waveform signal with a sine wave reference signal (e.g. at a commercial power supply frequency) received from a sine wave output section 22 to determine a sine wave correction signal.

The sine wave correction signal of the correction signal generator 21 is decided for allowing the output voltage of the inverter 3 to be governed by the output voltage setting received from the output voltage setting section 20. The sine wave correction signal is then inputted to the pulse width modulator 23 where a PWM signal is generated and supplied to the FET driver 13.

Figure 6:
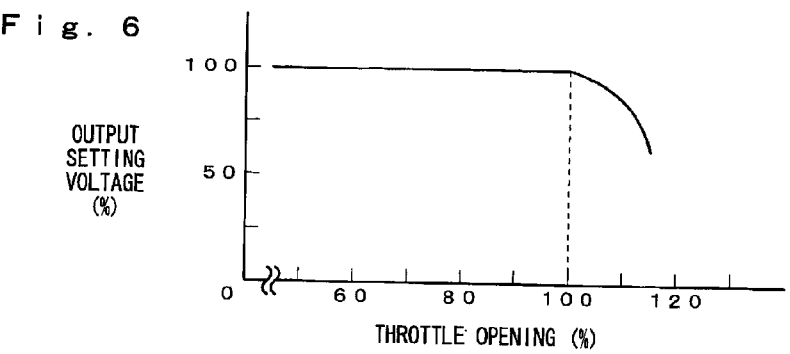
FIG. 6 illustrates an example of a table installed in an output voltage setter.

FIG. 6 illustrates an example of the table stored in the output voltage setting section 20. As apparent, when the throttle opening θTH is not higher than 100% or the full scale, the output voltage setting can be maintained at 100% of the rated level. When the throttle opening θTH exceeds 100% or comes into its overload range, the output voltage setting is gradually declined. It is preset that the output voltage is 70% of the rated level when the throttle opening θTH is 115%.

As the output voltage of the inverter 3 is controlled at an extra range exceeding the full scale of the throttle opening, the load to the engine is lowered and the engine can not be overloaded. Accordingly, the engine can continuously run at substantially its maximum power with the throttle TH being fully opened while its number of revolution remains not declined.

Figure 7:
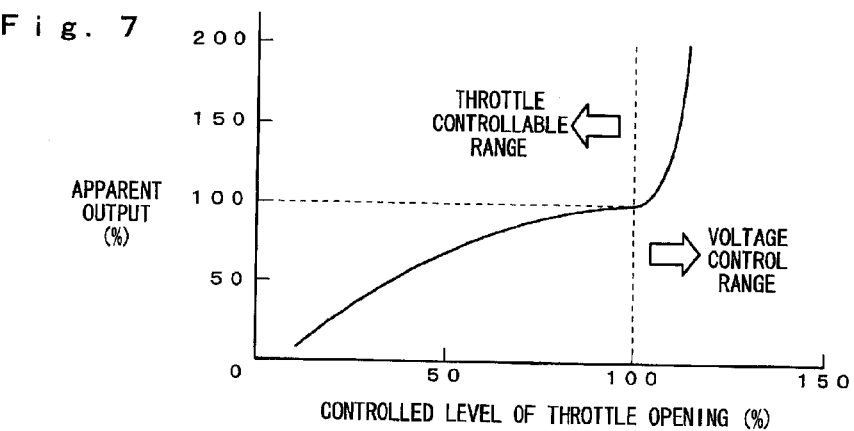
FIG. 7 illustrates a relationship between the throttle opening θTH (a controlled level of the opening) and an apparent output of the generator.

FIG. 7 illustrates the relationship between the throttle opening θTH (a controlled level of the throttle opening) detected by the throttle opening detector 19 and an apparent power output of the generator. The actual throttle opening θTH generally corresponds to the controlled level of the throttle opening when the throttle opening θTH stays not greater than 100%. As shown, the apparent output is also increased substantially proportional to the actual throttle opening θTH. As the throttle opening θTH approaches close to the 100%, the increase of the apparent output becomes slow. When the controlled throttle opening θTH exceeds 100% (with the actual throttle opening remaining at 100%), the apparent output is increased due to decrease of the output voltage.

The decrease of the output voltage may be assigned not in the extra range exceeding the full scale of the throttle opening but extending to the overload range from the throttle controllable range. This allows any shift to be smoothed between the normal load range with throttle control and the overload range without throttle control.

According to the above procedure, the output voltage is made to decreased through judging that the engine is overloaded when the throttle opening θTH exceeds 100%, thus allowing no declination in the power output of the engine. The judgment for overloading may be determined not when the throttle opening θTH exceeds 100% but by the reference throttle opening θTHOL (a reference level of the throttle opening) changing in relation to the number of engine revolutions.

For example, the torque of the engine is relatively high at a higher ranges of revolutions but low at a lower range of revolutions (2500 to 3000 rpm). The low torque may result in stalling of the engine at a lower range of revolutions. Such an unwanted stalling result can be avoided by decreasing the output voltage and thus increasing the power output of the engine. More specifically, the engine is set with the reference throttle opening θTHOL arranged small at the lower range of revolutions and great at the higher range of revolutions. The number of revolutions of the engine is detected by the revolution number detector 6.

Figure 8:
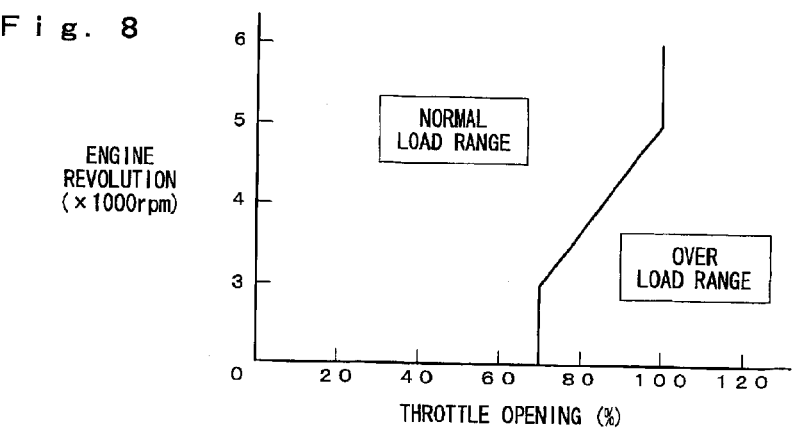
FIG. 8 illustrates an example of the throttle opening θTH (a controlled level of the opening) representing a reference for judgment of an overload range.

FIG. 8 illustrates a profile of the throttle opening θTH (a controlled level of the throttle opening) changing in relation to the number of engine revolutions for identifying the overload range. In the profile, the reference throttle opening θTHOL is 70% when the number of engine revolutions is not higher than 3000 rpm. When its opening θTH is not higher than 70%, the throttle is controlled to determine the power output of the engine. When the throttle opening θTH is higher than 70%, the output voltage of the inverter 3 is made to decreased to inhibit decrease in the number of engine revolutions.

While the number of engine revolutions ranges from 3000 rpm to 5000 rpm, the reference throttle opening θTHOL is increased from 70% to 100% in proportion to the increase of the number of revolutions. It is then judged that the engine is overloaded when the throttle opening θTH is 100% or fully opened at the extra range where the number of engine revolutions is higher than 5000 rpm.

Figure 9:
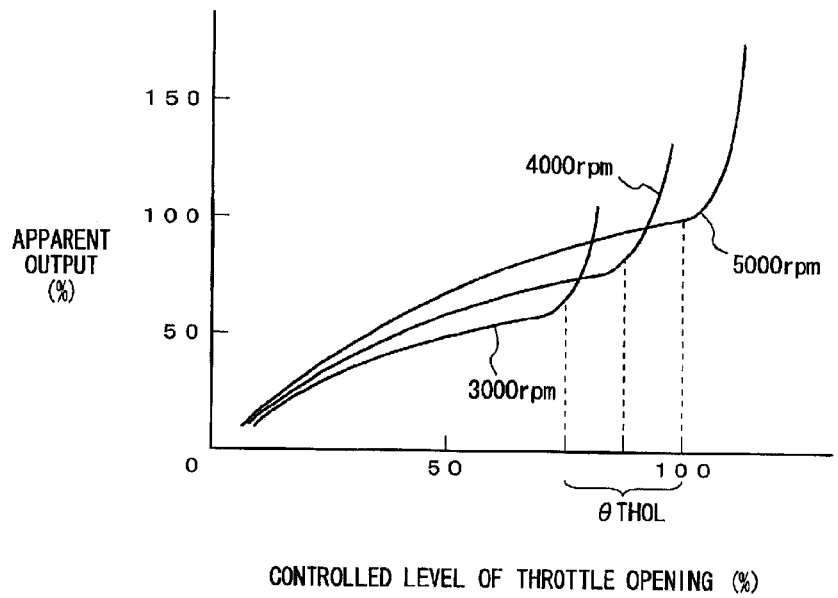
FIG. 9 illustrates a relationship between the throttle opening θTH and the apparent output of the generator.

FIG. 9 illustrates the relationship between the throttle opening θTH and the apparent output of the generator when the reference throttle opening θTH is changed in response to the number of engine revolutions. The actual throttle opening θTH corresponds to a controlled level of the throttle opening when it is smaller than the reference throttle opening θTHOL determined by the number of revolutions. As the actual throttle opening θTH approaches the reference throttle opening θTHOL, the increase in the apparent output of the generator becomes slow down. Yet, the apparent output increases substantially proportional to the actual throttle opening θTH. Finally, when the controlled level of the throttle opening θTH exceeds the respective reference throttle opening θTHOL, the apparent output is increased by declining the output voltage.

The reference throttle opening θTHOL is not limited to a variable which changes with the number of engine revolutions but may arbitrarily be a fixed value. For example, when the reference throttle opening θTHOL is set to not higher than 100% to limit the throttle controlling range, the engine can be used without being overloaded.

Also, the reference throttle opening θTHOL may be modified to a lower level depending on the temperature of the engine E. When the engine is substantially overheated, its overheated condition can be eliminated by lowering the load. The temperature of the engine is measured by the temperature detector 10.

Figure 10:
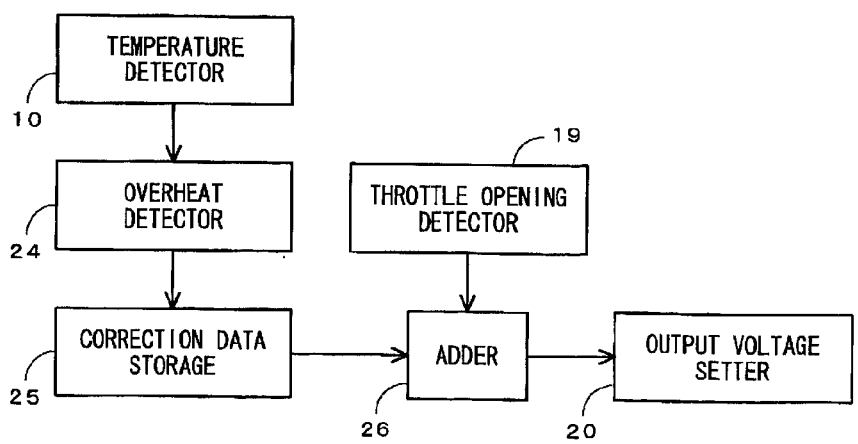
FIG. 10 is a block diagram showing a controlling action for decreasing a reference throttle opening θTHOL when an engine overheating is detected.

FIG. 10 is a block diagram showing a control function of modifying the reference throttle opening θTHOL to a lower level when the engine is overheated. Components denoted by the same numeral are the same or similar components as those of FIGS. 1 and 2. The throttle opening θTH is detected by the throttle opening detector 19 and corrected to a higher level; i.e. the reference throttle opening θTHOL is moved to low. In action, the temperature of the engine is measured by the temperature detector 10 and transferred to the overheat detector 24 where it is compared with a reference overheat temperature to determine whether the engine is overheated or not. When it is judged that the engine is overheated, a throttle opening correction value is read out from the correction data storage 25 and inputted to the adder 26. In the adder 26, the throttle opening correction setting is added to a measurement of the throttle opening θTH detected by the throttle opening detector 19. A resultant sum of the throttle opening θTH is used by the output voltage setter 20 for reading out an output voltage setting which corresponds to the sum. The output voltage setting read out is then transferred to the correction signal generator 21. Accordingly, as overloading is detected at a lower level of the throttle opening θTH than when the engine is actually overheated, the output voltage can be decreased.

Although the embodiment is intended to carry out the throttle control on a gasoline engine, the present invention may be applied to and thus cover any throttle valve equivalent control mechanism, such as a gas fuel supplying apparatus for a mixer in a gas engine or a fuel feeding control rack in a diesel engine, with equal success.

As defined in claims 1 to 9, the present invention set forth above allows the output voltage of a generator to be controlled to a lower level at the output voltage decreasing range which covers a throttle opening controlled range and/or a range exceeding the throttle opening controlled range.

As defined in claim 1 of the present invention, the load decreasing range is assigned within the controllable range of the throttle opening. This allows the engine to be operated in consideration of its characteristic that the torque is short in a lower number of the revolutions, thus inhibiting no slow down under any overload.

As defined in claim 3, the load is made to decreased in the range exceeding the throttle opening controllable range or the overload range. Accordingly, the engine can be held at substantially a maximum number of its revolutions during the operation.

As defined in claim 2 or 5, the load can be decreased by a level which is equal to a change expressed by the throttle opening setting value.

As defined in claim 4, the controllable range of the throttle opening is smoothly related to the load decreasing range determined by the output voltage drop. Accordingly, the engine can steadily be controlled in the number of revolutions. As defined in claims 6 to 9, the overload is detected at an earlier stage of the operation and the load can be decreased at higher control stability.

What is claimed is:

1. An engine generator having an engine, a generator driven by the engine, and a throttle controlling means for controlling the throttle opening in the engine so that the output voltage of the generator converged to a predetermined target value, wherein an output voltage decreasing range which corresponds to a predetermined scale of the opening is assigned within a controllable range of the throttle opening, and when the throttle opening control comes into the output voltage decreasing range, the output voltage of the generator is made to decreased.

2. An engine generator according to claim 1, wherein an opening setting value provided from the throttle controlling means for controlling the throttle opening is arranged indicative of a load in the throttle opening controllable range, and when the throttle opening control comes into the output voltage decreasing range, the output voltage is made to decreased to a level determined by the opening setting value.

3. An engine generator having an engine, a generator driven by the engine, and a throttle controlling means for controlling the throttle opening in the engine according to a control data which is determined that the output voltage of the generator converged to a predetermined target value, wherein an output voltage decreasing range is assigned to exceed a controllable range of the throttle opening, and when the throttle opening control comes into the output voltage decreasing range, the output voltage of the generator is made to decreased in response to the control data which is arranged indicative of the output voltage decreasing range.

4. An engine generator according to claim 3, wherein the output voltage decreasing range is assigned extending to the controllable range of the throttle opening.

5. An engine generator according to claim 3 or 4, wherein the control data provided from the throttle controlling means for controlling the throttle opening is an opening setting value which is arranged indicative of a load in both the throttle opening controllable range and the range exceeding the throttle opening controllable range, and when the throttle opening control comes into the output voltage decreasing range, the output voltage is made to decreased in response to the opening setting value.

6. An engine generator according to claim 2, wherein the output voltage decreasing range is shifted to its less loaded side determined by the throttle opening setting value when the number of engine revolutions remains low.

7. An engine generator according to claim 5, wherein the output voltage decreasing range is shifted to its less loaded side determined by the throttle opening setting value when the number of engine revolutions remains low.

8. An engine generator according to claim 2, wherein the output voltage decreasing range is shifted to its less loaded side determined by the throttle opening setting value when the engine is overheated.

9. An engine generator according to claim 5, wherein the output voltage decreasing range is shifted to its less loaded side determined by the throttle opening setting value when the engine is overheated.

* * * * *